C. H. SEAWELL.

ILLUMINATING-SIGNS.

No. 7,856. Reissued Aug. 21, 1877.

*Witnesses*

Chas. J. Gooch

W. R. Edelen.

*Inventor.*

Charles H. Seawell

By Knight Bros attorneys

UNITED STATES PATENT OFFICE.

CHARLES H. SEAWELL, OF ST. LOUIS, MISSOURI.

IMPROVEMENT IN ILLUMINATING-SIGNS.

Specification forming part of Letters Patent No. 189,796, dated April 17, 1877; Reissue No. 7,856, dated August 21, 1877; application filed June 21, 1877.

*To all whom it may concern:*

Be it known that I, CHARLES H. SEAWELL, of the city of St. Louis and State of Missouri, have invented a certain new and useful Improvement in Illuminating-Signs, of which the following is a full, clear, and exact description, reference being had to the accompanying drawings, making part of this specification.

My improvement in its most preferred form consists in forming the transparent side or sides of the sign-case with a frame of transparent glass upon the outside, then a sheet of opaque substance, such as metal, card-board, &c., having letters painted or otherwise marked thereon, said letters being perforated, so as to indicate the form of the letter by the light shining through the perforations. Inside the opaque plate is a pane of glass, rendered semi opaque or translucent in any manner, so as to soften and diffuse the light.

Figure 1:
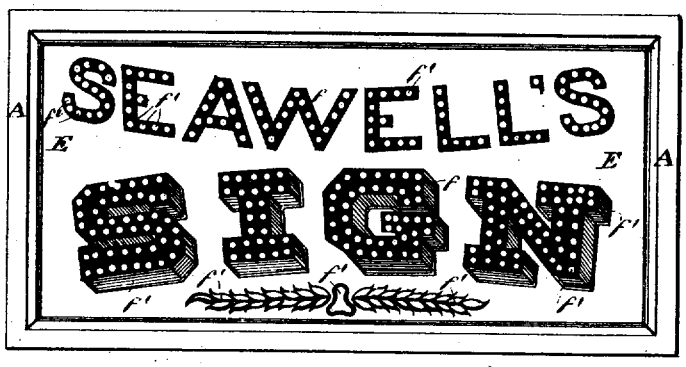
Figure 2:
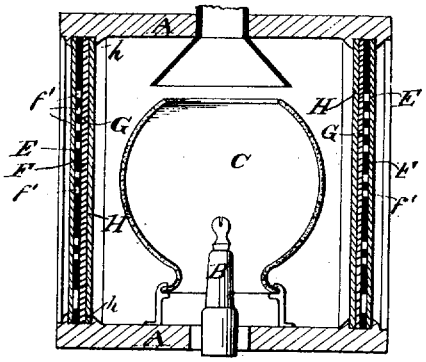
Figure 3:
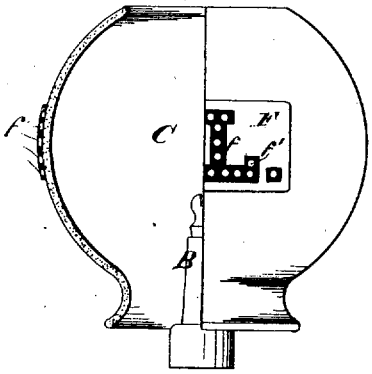

In the drawings, Figure 1 is a front view of a sign having my improvement. Fig. 2 is a section showing my improvement with a transparent pane upon both the outside and inside of each face. Fig. 3 is a side view of the globe, having an opaque perforated plate in close contact therewith, partly in section.

A is the case, which may be made of any form or size. B is the burner, which may be made to use coal-oil; or common gas, or any other suitable light, may be used.

The light is surrounded by a globe, C, as shown in a prior application, and, therefore, not claimed herein, of semi-opaque glass, on which may be an opaque plate, having letters marked thereon, and containing perforations, so as to show the form of the letters at night by the light shining through the holes. (See Fig. 3.) Thus the globe C may perform the office of a sign inside the room, and the main face be made to show outside the same as a street-sign, the rear or inner side of the sign being partly or wholly open in such case, to exhibit the globe.

The case may have as many illuminated faces as desired. In Fig. 2 I show a face having four layers or plates, the outer one, E, of transparent glass, the second one, F, of some opaque substance, such as metal, pasteboard, wood, or other suitable material, having letters *f* painted or otherwise marked thereon, so as to make a sign readable by daylight, or by light from the outside of the case. These letters *f* have perforations *f'*, through which the light shines, so as to make the sign readable in the dark by the light shining through the perforations. Next, inside the plate or board F is a pane or plate, G, of semi-transparent or translucent material, such as glass rendered partially opaque by painting or other process. The painted side of such glass may be turned away from plate F and protected from smoke, fumes, and dust by a plate or pane, H, of transparent glass placed inside of it, and, preferably, connected to it all around the edges by cement or a sealing-strip, *h*, forming a joint impervious to any fumes, dust, &c., that might otherwise dirty or corrode the paint.

The plate E may be made removable from the outside, or all the panes, &c., E F G H, may be made removable inward, the panes G and H being fastened and removed together, so that their outer faces may be washed when required, or all the said parts of the face E F G H may be tightly sealed in the case, so that only the outer faces of E and H will require washing.

As a modification, the outer glass E may be dispensed with, leaving the board or plate F exposed upon the outer side, or where the outer plate E is present and the inner plate H dispensed with, the painted face of plate or pane G is turned inward against the back of plate F.

I claim—

The illuminating-sign, having the combination in its face or faces of the outer transparent pane E, the lettered and perforated plate F, the semi transparent or translucent pane or plate G, substantially as set forth.

CHAS. H. SEAWELL.

In presence of—

SAML. KNIGHT,

CHAS. HALL.